United States Patent
Preisler et al.

(10) Patent No.: US 8,808,835 B2
(45) Date of Patent: Aug. 19, 2014

(54) SYSTEM INCLUDING A PANEL ASSEMBLY HAVING A CONTAINER AND A COMPRESSION-MOLDED, COMPOSITE COVER FOR COVERING THE CONTAINER

(71) Applicant: Global IP Holdings, LLC, Sterling Heights, MI (US)

(72) Inventors: Darius J. Preisler, Macomb, MI (US); Christopher A. Heikkila, Washington Township, MI (US)

(73) Assignee: Global IP Holdings, LLC, Sterling Heights, MI (US)

( * ) Notice: Subject to any disclaimer, the term of this patent is extended or adjusted under 35 U.S.C. 154(b) by 1 day.

(21) Appl. No.: 13/762,861

(22) Filed: Feb. 8, 2013

(65) Prior Publication Data

US 2014/0145470 A1 May 29, 2014

Related U.S. Application Data

(63) Continuation-in-part of application No. 13/762,832, filed on Feb. 8, 2013, and a continuation-in-part of application No. 13/687,232, filed on Nov. 28, 2012, and a continuation-in-part of application No. 13/687,213, filed on Nov. 28, 2012, and a continuation-in-part of application No. 13/689,809, filed on Nov. 30, 2012, and a continuation-in-part of application No. 13/690,566, filed on Nov. 30, 2012.

(51) Int. Cl.
*B32B 3/08* (2006.01)
*B32B 5/14* (2006.01)
*B32B 3/12* (2006.01)
*E04F 15/02* (2006.01)
*B62D 25/20* (2006.01)

(52) U.S. Cl.
CPC ...... *B62D 25/2054* (2013.01); *E04F 15/02177* (2013.01)
USPC ........ 428/116; 296/39.1; 296/39.2; 296/39.3; 296/97.23; 428/95; 428/98; 428/99

(58) Field of Classification Search
CPC .......... A47G 27/02; B29C 43/00; B32B 3/02; B32B 3/04; B32B 3/12; B32B 3/263; B60R 5/00; B60R 5/04; B60R 13/00; B60R 13/011; B62D 25/20
USPC .............. 428/95, 98, 99, 116; 296/39.1, 39.2, 296/39.3, 97.23
See application file for complete search history.

(56) References Cited

U.S. PATENT DOCUMENTS 5,026,445 A 6/1991 Mainolfi et al.
5,298,694 A 3/1994 Thompson et al.
(Continued)

OTHER PUBLICATIONS

Office Action; related U.S. Appl. No. 13/479,974; date of mailing Mar. 20, 2014.
(Continued)

*Primary Examiner* — Brent O'Hern
(74) *Attorney, Agent, or Firm* — Brooks Kushman P.C.

(57) ABSTRACT

A system including a panel assembly having a container and a compression-molded, composite cover for covering the container is provided. The system may be a flooring system such as a vehicle flooring system and the assembly may be a floor panel assembly. The assembly includes at least one load-bearing component positioned between a lower outer layer of the cover and a bottom wall of the container in a closed position of the cover. Each component is bonded or joined to the outer layer and is in abutting engagement with the bottom wall in the closed position of the cover to transfer a load appearing at an outer surface of an upper outer layer of the cover to the bottom wall of the container. The system also includes a structure such as floor having a cavity for receiving the panel assembly.

20 Claims, 3 Drawing Sheets

(56) References Cited

U.S. PATENT DOCUMENTS

| | | | |
|---|---|---|---|
| 5,502,930 A | 4/1996 | Burkette et al. | |
| 5,534,097 A | 7/1996 | Fasano et al. | |
| 5,683,782 A | 11/1997 | Duchene | |
| 5,915,445 A | 6/1999 | Rauenbusch | |
| 5,979,962 A | 11/1999 | Valentin et al. | |
| 6,050,630 A | 4/2000 | Hochet | |
| 6,066,217 A | 5/2000 | Dibble et al. | |
| 6,102,464 A | 8/2000 | Schneider et al. | |
| 6,435,577 B1 | 8/2002 | Renault | |
| 6,537,413 B1 | 3/2003 | Hochet et al. | |
| 6,631,785 B2 | 10/2003 | Khambete et al. | |
| 6,655,299 B2 | 12/2003 | Preisler et al. | |
| 6,659,223 B2 | 12/2003 | Allison et al. | |
| 6,682,675 B1 | 1/2004 | Vandangeot et al. | |
| 6,682,676 B1 | 1/2004 | Renault et al. | |
| 6,748,876 B2 | 6/2004 | Preisler et al. | |
| 6,790,026 B2 | 9/2004 | Vandangeot et al. | |
| 6,793,747 B2 | 9/2004 | North et al. | |
| 6,823,803 B2 | 11/2004 | Preisler | |
| 6,843,525 B2 | 1/2005 | Preisler | |
| 6,890,023 B2 | 5/2005 | Preisler et al. | |
| 6,981,863 B2 | 1/2006 | Renault et al. | |
| 7,014,259 B2 | 3/2006 | Heholt | |
| 7,090,274 B1 | 8/2006 | Khan et al. | |
| 7,093,879 B2 | 8/2006 | Putt et al. | |
| 7,264,685 B2 | 9/2007 | Katz et al. | |
| 7,320,739 B2 | 1/2008 | Thompson, Jr. et al. | |
| 7,402,537 B1 | 7/2008 | Lenda et al. | |
| 7,419,713 B2 | 9/2008 | Wilkens et al. | |
| 7,837,009 B2 | 11/2010 | Gross et al. | |
| 7,909,379 B2 | 3/2011 | Winget et al. | |
| 7,918,313 B2 | 4/2011 | Gross et al. | |
| 7,919,031 B2 | 4/2011 | Winget et al. | |
| 8,117,972 B2 | 2/2012 | Winget et al. | |
| 8,133,419 B2 | 3/2012 | Burks et al. | |
| 8,622,456 B2 | 1/2014 | Preisler et al. | |
| 8,690,233 B2 | 4/2014 | Preisler et al. | |
| 2003/0079659 A1* | 5/2003 | Preisler et al. | 108/51.3 |
| 2005/0189674 A1 | 9/2005 | Hochet et al. | |
| 2006/0185866 A1 | 8/2006 | Jung et al. | |
| 2006/0255611 A1 | 11/2006 | Smith et al. | |
| 2007/0069542 A1 | 3/2007 | Steiger et al. | |
| 2008/0105866 A1 | 5/2008 | Jeong et al. | |
| 2010/0026031 A1 | 2/2010 | Jouraku | |
| 2011/0315310 A1 | 12/2011 | Trevisan et al. | |
| 2013/0278002 A1 | 10/2013 | Preisler et al. | |
| 2013/0278003 A1 | 10/2013 | Preisler et al. | |
| 2013/0278009 A1 | 10/2013 | Preisler et al. | |
| 2013/0278015 A1 | 10/2013 | Preisler et al. | |
| 2013/0278018 A1 | 10/2013 | Preisler et al. | |
| 2013/0278019 A1 | 10/2013 | Preisler et al. | |
| 2013/0278020 A1 | 10/2013 | Preisler et al. | |
| 2013/0280469 A1 | 10/2013 | Preisler et al. | |
| 2013/0280472 A1 | 10/2013 | Preisler et al. | |
| 2013/0280473 A1 | 10/2013 | Preisler et al. | |
| 2013/0312652 A1 | 11/2013 | Preisler et al. | |
| 2013/0316123 A1 | 11/2013 | Preisler et al. | |
| 2014/0077518 A1 | 3/2014 | Preisler et al. | |
| 2014/0077530 A1 | 3/2014 | Preisler et al. | |
| 2014/0077531 A1 | 3/2014 | Preisler et al. | |
| 2014/0145465 A1 | 5/2014 | Preisler et al. | |
| 2014/0145470 A1 | 5/2014 | Preisler et al. | |
| 2014/0147617 A1 | 5/2014 | Preisler et al. | |
| 2014/0147622 A1 | 5/2014 | Preisler et al. | |

OTHER PUBLICATIONS

Office Action; related U.S. Appl. No. 13/686,362; date of mailing Mar. 25, 2014.
Office Action; related U.S. Appl. No. 13/523,253; date of mailing Mar. 25, 2014.
Office Action; related U.S. Appl. No. 13/688,972; date of mailing Mar. 28, 2014.
Office Action; related U.S. Appl. No. 13/687,232; date of mailing Mar. 28, 2014.
Office Action; related U.S. Appl. No. 13/689,809; date of mailing Mar. 31, 2014.
Office Action; related U.S. Appl. No. 13/687,213; date of mailing Mar. 31, 2014.
Office Action; related U.S. Appl. No. 13/690,265; date of mailing Mar. 31, 2014.
Office Action; related U.S. Appl. No. 13/762,904; date of mailing Apr. 8, 2014.
Office Action; related U.S. Appl. No. 13/762,800; date of mailing Apr. 8, 2014.
Office Action; related U.S. Appl. No. 13/762,861; date of mailing Apr. 9, 2014.
Office Action; related U.S. Appl. No. 13/690,566; date of mailing Apr. 9, 2014.
Office Action; related U.S. Appl. No. 13/762,832; date of mailing Apr. 11, 2014.
Office Action; related U.S. Appl. No. 13/762,921; date of mailing Apr. 14, 2014.
Notice of Allowance; related U.S. Appl. No. 13/686,388; date of mailing Apr. 15, 2014.
Related U.S. Appl. No. 13/690,566, filed Nov. 30, 2012.
Related U.S. Appl. No. 13/762,921, filed Feb. 8, 2013.
Related U.S. Appl. No. 13/762,956, filed Feb. 8, 2013.
Office Action; related U.S. Appl. No. 13/453,201 (now USPN 8,690,233); date of mailing Nov. 20, 2013.
Office Action; related U.S. Appl. No. 13/523,209 (now USPN 8,622,456) date of mailing Apr. 29, 2013.

* cited by examiner

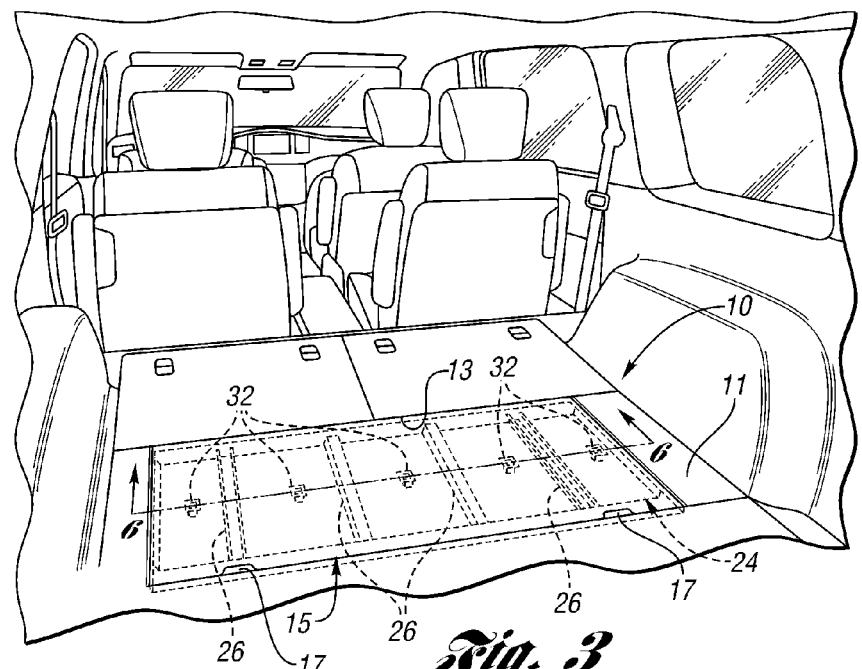
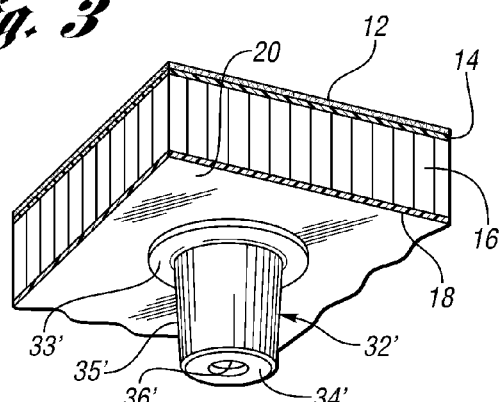
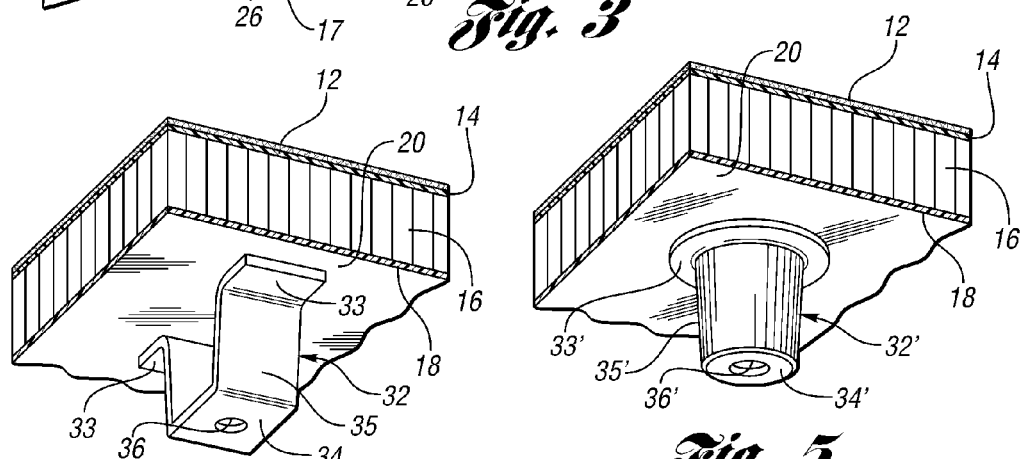
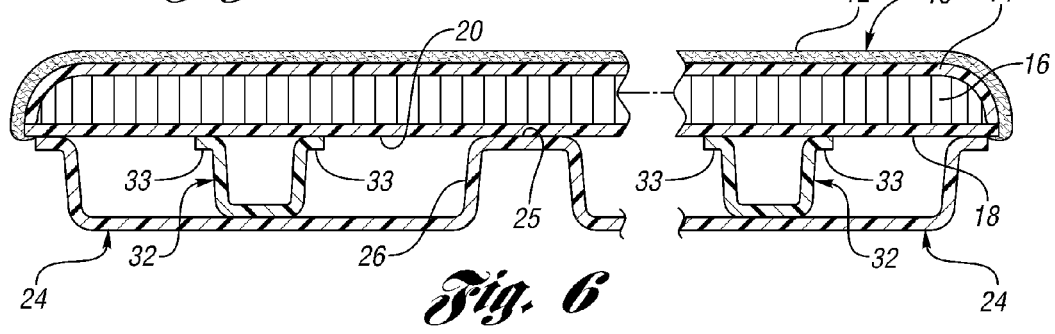

SYSTEM INCLUDING A PANEL ASSEMBLY HAVING A CONTAINER AND A COMPRESSION-MOLDED, COMPOSITE COVER FOR COVERING THE CONTAINER

CROSS-REFERENCE TO RELATED APPLICATIONS

This application is a continuation-in-part application of U.S. application entitled "Sandwich-Type, Structural, Composite Panel Having a Pattern of Depressions Formed At a Lower Outer Surface Thereof and Stiffening Supports Received and Retained Therein" filed on the same day as this application and having Ser. No. 13/762,832.

This application is also a continuation-in-part application of U.S. application entitled "Sandwich-Type, Composite Component Such As Motor Vehicle Component and Unitary Structural Assembly Utilizing Same" filed Nov. 28, 2012 and having U.S. Ser. No. 13/687,232.

This application is a continuation-in-part application of U.S. application entitled "Assembly Including a Compression-Molded, Composite Panel Locally Reinforced Adjacent a Living Hinge of the Assembly" filed Nov. 28, 2012 and having U.S. Ser. No. 13/687,213. This application is also a continuation-in-part application of U.S. patent application entitled "Sandwich-Type, Structural Component Composite Having a Cut-Out Feature With a Substantially Hidden Core Assembly Utilizing Same and Panel For Use In a Vehicle Load Floor Assembly" filed Nov. 30, 2012, and having U.S. Ser. No. 13/689, 809.

This application is further a continuation-in-part application of U.S. patent application entitled "Compression-Molded Compression Component Having a Sandwich Structure and Having Integrally Formed Strengthening Structures" also filed Nov. 30, 2012 and having U.S. Ser. No. 13/690,566.

OVERVIEW

Some compression-molded composites combine a lightweight, low-density core with fiber-reinforced thermoplastic skins or outer layers thereby resulting in a sandwich structure. The resulting composite component has a high stiffness-to-weight ratio thereby making it desirable for use in a wide variety of applications including load-bearing applications. In general, the thicker the core, the higher the load-bearing capacity of the composite component.

As a result of their high stiffness-to-weight ratio and load bearing capacity, such compression-molded composites have been used as load floors in automotive applications and as skis or snowboards (i.e., sliding boards) in recreational applications.

The prior art discloses a method of making a panel of sandwich-type composite structure having a cellular core in a single processing step. In that method, the panel is made by subjecting a stack of layers of material to cold-pressing in a mold. As shown in FIG. 1, the stack is made up of: at least a first skin made of a stampable reinforced thermoplastics material, a cellular core made of a thermoplastics material, and a second skin also made of a stampable reinforced thermoplastics material. The stack may also include one or more external covering layers made of a woven or non-woven thermoplastic material. The skins are typically pre-heated outside the mold to a softening temperature.

Such a method is particularly advantageous because of the fact that it makes it possible, in a single operation, to generate cohesion and bonding between the various layers of the composite structure as shown in FIG. 2, and to shape the resulting panel while preserving all of the mechanical properties imparted by the cellular-core sandwich structure.

Panels of sandwich-type composite structure having a cellular core have rigidity characteristics sufficient to enable mechanical structures subjected to large stresses to be reinforced structurally without making them too heavy. Such panels are in common use in shipbuilding, aircraft construction, and rail vehicle construction.

The following U.S. patent documents are related to the present invention: U.S. Pat. Nos. 5,683,782; 7,419,713; 6,890,023; 6,843,525; 6,537,413; 6,050,630; and 2005/0189674.

One problem associated with such composites is that their function and design freedom is limited by their designed material thickness.

Other U.S. patent documents related to the present invention include: U.S. Pat. Nos. 5,502,930; 5,915,445; 6,102,464; 6,435,577; 6,655,299; 6,682,675; 6,748,876; 6,790,026; 6,682,676; 6,823,803; 6,981,863; 7,090,274; 7,909,379; 7,919,031; 8,117,972; 2006/0255611; 2007/0069542; 2008/0185866; 2006/0185866; and 2011/0315310.

A wide variety of welding technologies exist to join or bond plastic components together such as: ultrasonic welding; vibration welding; thermal welding; spin welding; infrared welding; hot plate welding; and laser welding. U.S. Pat. Nos. 6,066,217 and 5,026,445 are examples of such welding technologies.

Also, a wide variety of adhesives such as liquid and heat-sensitive solid film adhesive may be used to join plastic components together. Oftentimes a mold is used in the bonding process. U.S. Pat. Nos. 8,133,419; 5,534,097 and 2011/0315310 are examples.

Another problem associated with the prior art is that it is often not desirable to increase the thickness of the core in order to increase the load bearing capacity or the required height or depth of the composite component. Also, due to the nature of the outer layer of the component, it is often difficult to attach other components or parts at the under surface of the composite component to raise the top surface level of the component so that it is substantially co-planar with the surrounding structures especially if the component is one of a plurality of substantially planar panels, such as in a vehicle load floor.

Yet another problem associated with the prior art is that load supporting panels must satisfy OEM deflection criteria in an automotive setting. Typical OEM deflection criteria are as follows:

Max Allowable Deflection Range: 8-15 mm from baseline "A" (FIG. 4) from a load exerting a force "F" on a panel comprising outer skins 12 and 16 and a honeycomb core 14 therebetween.

Load Surface Size: 4: Diameter of 10"×10" square;

Test Temperature: −30 C, ambient, 85 C;

Surrounding Support: Depends on application, but mainly 4-sided support; and

Other Requirements: No part damage or permanent set greater than 3 mm

The term "facing material" refers to a material used to conceal and/or protect structural and/or functional elements from an observer. Common examples of facing materials include upholstery, carpeting, and wall coverings (including stationary and/or movable wall coverings and cubicle wall coverings). Facing materials typically provide a degree of aesthetic appearance and/or feel, but they may also provide a degree of physical protection to the elements that they conceal. In some applications, it is desirable that the facing material provide properties such as, for example, aesthetic appeal (for example, visual appearance and/or feel) and abrasion resistance.

Facing materials are widely used in motor vehicle construction. In the automotive industry, it is common practice to refer to various surfaces as being A-, B-, or C-surfaces.

As used herein, the term "A-surface" refers to an outwardly-facing surface for display in the interior of a motor vehicle. This surface is a very high visibility surface of the vehicle that is most important to the observer or that is most obvious to the direct line of vision. With respect to motor vehicle interiors, examples include dashboards, instrument panels, steering wheels, head rests, upper seat portions, headliners, load floors and pillar coverings.

Open edges on sandwich panels can be closed-off and sealed with edge fillers, extrusions, epoxy potting or tape to prevent moisture ingress, to enhance appearance or permit subsequent fixings. Moisture absorption may result in increased weight and performance degradation over a prolonged time period. Such degradation may be further hastened by impact and wear. Such degradation may prevent usage of conventional composite sandwich panels in maintenance and high wear areas of a vehicle.

Edge closures such as edge fillers, extrusions, epoxy potting or tape, however, are fixed to the sandwich-structure composite panels in a separate and subsequent operation, after the panels have been formed as shown in U.S. Pat. No. 8,117,972. That subsequent operation requires an additional workstation, be it automated or otherwise, which increases, in particular, the manufacturing time and cost of the finished parts.

In addition, separate edge closures mounted on a composite panel of the sandwich-type are a source of quality defects, and thus adds to the cost of making such panels. Imperfections or damage to such edge closures may degrade the aesthetic appearance of the panels or components as well as the functional requirements of the panels or components.

SUMMARY OF EXAMPLE EMBODIMENTS

An object of at least one embodiment of the present invention is to provide a system such as a flooring system including a panel assembly which has a cover with a compression-molded composite component with a designed material thickness wherein the function and design freedom of the component is expanded through the use of a container and one or more load-bearing components attached to a bottom layer of the component.

In carrying out the above object and other objects of at least one embodiment of the present invention, a flooring system is provided. The system includes a floor panel assembly having a container with bottom and side walls and a compression-molded, composite cover for covering the container in a closed position of the cover. The cover has a first outer layer with a first outer surface, a second outer layer with a second outer surface and a core positioned between the outer layers and having a large number of cavities, wherein the outer layers are bonded to the core by press molding. The assembly further has at least one load-bearing component positioned between the second outer layer and the bottom wall of the container in the closed position of the cover. Each component is bonded or joined to second outer layer and is in abutting engagement with the bottom wall in the closed position of the cover to transfer a load appearing at the first outer surface to the bottom wall of the container. The system also includes a floor having a cavity for receiving the floor panel assembly.

Thickness of the panel assembly may be substantially equal to depth of the cavity.

A plurality of load-bearing components may be positioned between the second outer layer and the bottom wall of the container in the closed position of the cover.

Each of the load-bearing components may include at least one laterally extending attachment flange for attaching the component to the second outer layer.

Each of the components may be u-shaped in section and may include a pair of laterally extending attachment flanges.

Each of the components may have an annular attachment flange wherein a part of each of the components is frustum-shaped.

The system may further include at least one fastener for fastening the cover to the container in the closed position of the cover.

Each of the load-bearing components may include a fastener-receiving aperture in communication with and aligned with a fastener-receiving aperture formed in bottom wall of the container in the closed position of the cover. A fastener may be received and retained within its respective aligned apertures to fasten the container to the cover in the closed position of the cover.

Each of the fasteners may be threaded.

Portions of the bottom wall may be sized, shaped and arranged laterally adjacent to each other in a pattern and in abutting engagement with the second outer layer in the closed position of the cover to provide the cover with support to resist deflation from a load at various positions and locations at the first outer surface of the first outer layer.

The portions may form an integral, unitary support structure. A load-bearing component may be positioned between each pair of laterally adjacent portions in the closed position of the cover.

The support structure may define a series of ridges and grooves.

Each of the load-bearing components may be a plastic resin component bonded to the second outer layer.

The bottom wall of the container may be a plastic resin bottom wall wherein each of the plastic resin components is bonded to the plastic resin bottom wall.

The bottom wall of the container may be a metal bottom wall.

The cover may have a cover layer bonded to an upper surface of the first outer layer.

An edge portion of the cover may be locally crushed by the press-molding so that the layers are bonded together to form a sealed, moisture-resistant edge.

Further in carrying out the above object and other objects of at least one embodiment of the present invention, a vehicle interior panel system is provided. The system includes a panel assembly having a container with bottom and side walls and a compression-molded, composite cover for covering the container in a closed position of the cover. The cover has a first outer layer with a first outer surface, a second outer layer with a second outer surface and a core positioned between the outer layers and having a large number of cavities. The outer layers are bonded to the core by press molding. The assembly also includes at least one load-bearing component positioned between the second outer layer and the bottom wall of the container in the closed position of the cover. Each component is bonded or joined to second outer layer and is in abutting engagement with the bottom wall in the closed position of the cover to transfer a load appearing at the first outer surface to the bottom wall of the container. The system also includes a vehicle interior structure having a cavity for receiving the panel assembly.

Yet still further in carrying out the above object and other objects of at least one embodiment of the present invention, a vehicle flooring system is provided. The system includes a floor panel assembly which has a container having bottom and side walls and a compression-molded, composite cover for covering the container in a closed position of the cover. The cover has a first outer layer with a first outer surface, a second outer layer with a second outer surface and a core positioned between the outer layers and having a large number of cavities. The outer layers are bonded to the core by press molding. The assembly further includes at least one load-bearing component positioned between the second outer layer and the bottom wall of the container in the closed position of the cover. Each component is bonded or joined to second outer layer and is in abutting engagement with the bottom wall in the closed position of the cover to transfer a load appearing at the first outer surface to the bottom wall of the container. The system also includes a vehicle floor having a cavity for receiving the floor panel assembly.

Other technical advantages will be readily apparent to one skilled in the art from the following figures, descriptions and claims. Moreover, while specific advantages have been enumerated, various embodiments may include all, some or none of the enumerated advantages.

BRIEF DESCRIPTION OF THE DRAWINGS

FIG. 3 is an environmental view, partially broken away, of an automotive vehicle flooring system including a floor panel assembly constructed in accordance with at least one embodiment of the present invention;

FIG. 4 is a perspective view, partially broken away and in cross section, of one embodiment of a load-bearing component of the assembly of FIG. 3;

FIG. 5 is a view, similar to the view of FIG. 4, of a second embodiment of a load-bearing component of the assembly of FIG. 3;

FIG. 6 is a view, partially broken away and in cross section, taken along lines 6-6 of FIG. 3 and showing a floor panel assembly with its cover bonded to its plastic container via its load bearing components and constructed in accordance with at least one embodiment of the present invention;

BRIEF DESCRIPTION OF EXAMPLE EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring now to FIG. 3, one example embodiment of a vehicle panel or flooring system of the present invention is shown. The system includes a floor panel assembly, generally indicated at 10. The system also includes a floor or vehicle structure 11 having a cavity 13 in which the assembly 10 is received to form a substantially level vehicle flooring system.

Figure 8:
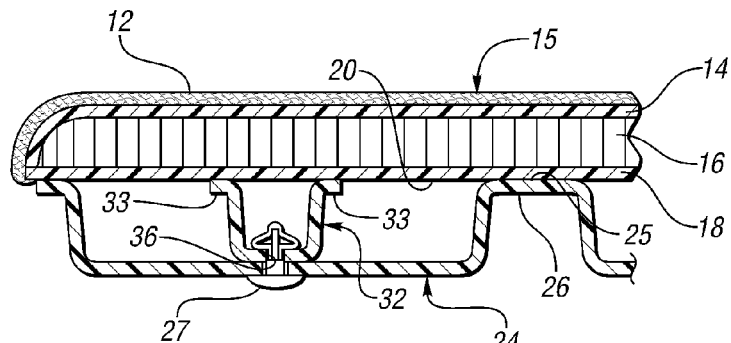
FIG. 8 is a view, similar to the view of FIG. 7, but with a different type of fastener and a plastic container.
Figure 9:
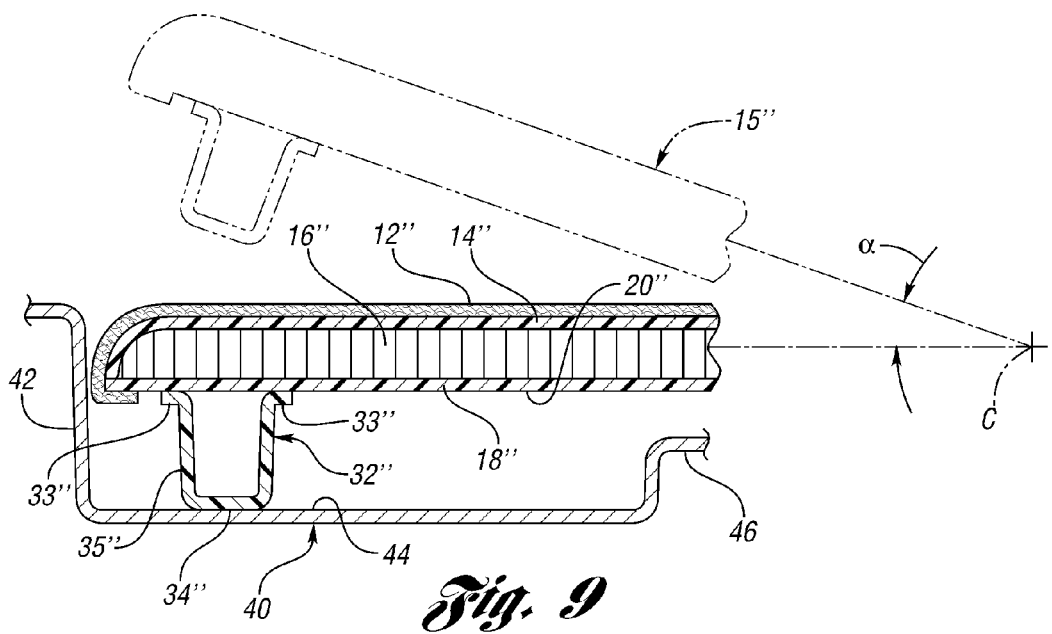
FIG. 9 is a view, partially broken away and in cross section, of a different embodiment of a floor panel assembly wherein the compression-molded composite cover is free to pivot through an angle, α, about an axis, C, between different use positions including a closed position indicated by solid lines and an open position indicated by phantom lines.

The assembly 10 includes a container 24 (FIG. 3-8) or 40 (FIG. 9) which has bottom and side walls. The container 40 has walls 42 and a strengthening rib 46 as shown in FIG. 9. The assembly 10 also includes a sandwich-type, structural, compression-molded, composite panel or cover, generally indicated at 15 (FIGS. 3 and 6-8) and 15" (FIG. 9) for covering its respective container 24 or 40 in the closed position of the cover 24 or 40.

In the example embodiment of FIG. 3, the panel assembly 10 takes the form of drop-in, floor panel assembly having hand cut-outs 17 for use in an automotive vehicle load floor, which may be carpeted. In the example embodiment of FIG. 9, the panel assembly takes the form of a pivotable lid and container assembly for a vehicle load floor.

In the example embodiment of FIG. 9, the panel or cover 15" is hingedly attached such as by a living hinge to the floor structure 11 for movement through an angle, α, about a central axis, C. It is to be understood that the panel assembly 10 constructed in accordance with at least one embodiment of the present invention may be used in a wide variety of environments besides the automotive vehicle environments of FIGS. 3 and 9.

Referring to FIGS. 4-8, the cover 15 (as well as the cover 15" of FIG. 9) is typically manufactured by providing a stack of materials located or positioned within a compression mold. The stack includes first and second reinforced thermoplastic skins or outer layers 14 and 18, respectively, and a core having a large number of cavities such as a thermoplastic cellular core 16 disposed between and bonded to the skins 14 and 18 by press molding within the compression mold. A covering or carpet layer 12 made of thermoplastics material may cover and be bonded to the first skin 14 during the compression molding to provide a top, carpeted, support surface as shown in FIG. 3. The skins 14 and 18 are heated typically outside of the mold to a softening temperature. The mold is preferably a low-pressure, compression mold which performs a thermo-compression process on the stack of materials.

During the molding process, the inner surfaces of dies of the mold crush the core 16 of the cover 15 at edge portions of the cover 15 so that the layers 14 and 18 are bonded together to form a sealed, moisture-resistant, A-surface edge all around the assembly 10 to display in the interior of the vehicle. The crushed portions of the cover 15 have a reduced thickness.

Figure 1:
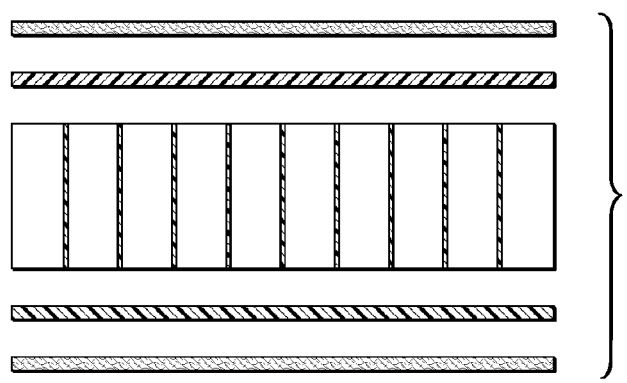
FIG. 1 is a side sectional view showing various separate layers of a prior art stack of thermoplastic-based layers of material.
Figure 2:
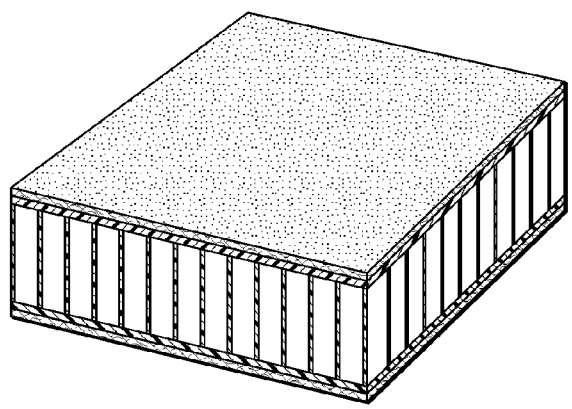
FIG. 2 is a top perspective view of the stack of FIG. 1 after compression molding.
Figure 7:
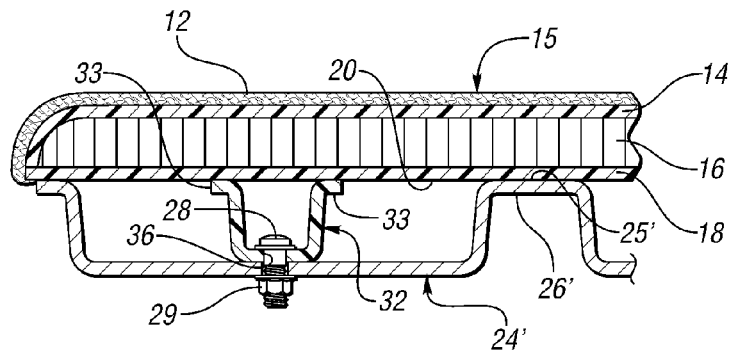
FIG. 7 is a view, similar to the view of FIG. 6, and showing a floor panel assembly with a metal container and its cover fastened together via a nut and bolt fastener in accordance with another embodiment of the present invention.

The assembly 10 also includes a plurality of load-bearing components, generally indicated at 32 (or 32' in FIG. 5 or 32" in FIG. 9) bonded or joined to the second outer layer 18 at its outer surface 20. The components 32 are sized, shaped and arranged at the outer surface 20 of the layer 18 to transfer a load appearing at the first outer surface of the first outer layer 14 to the bottom wall of the container 24 in the closed position of the cover 15 as shown in FIGS. 6-8. In this way, the cover 15 resists deflection from a load at various positions and orientations at the outer surface of the carpet layer 12.

The load-bearing components 32 preferably comprise thermoplastic components. Each of the components 32 has a height substantially equal to depth of the container 24 and abuttingly engages the bottom wall of the container 24 in the closed position of the cover 15. The components 32 are bonded or joined to the bottom wall of the container 24 of FIG. 6.

The components 32 of FIGS. 4, 6, 7 and 8 are u-shaped in cross-section. Each of the components 32 has a central wall portion 35 and a pair of laterally extending flange portions 33 for bonding or joining each component 32 to the second outer layer 18.

A different embodiment of a thermoplastic load-bearing component is generally indicated at 32' in FIG. 5. The component 32' has a frustum-shaped central wall portion 35' connected to an annular attachment flange 33' for bonding or joining the component 32' to the second outer layer 18.

A wide variety of welding technologies exist to join or bond the plastic components 32 or 32' to the outer layer 18 (and the component 32 to the bottom wall of the container 24 of FIG. 6) such as: ultrasonic welding; vibration welding; thermal welding; spin welding; infrared welding; hot plate welding; and laser welding. U.S. Pat. Nos. 6,066,217 and 5,026,445 are examples of such welding technologies. Also, a wide variety of adhesives such as liquid and heat-sensitive solid film adhesive may be used to join the plastic components together. Oftentimes a mold is used in the bonding process. U.S. Pat. Nos. 8,133,419; 5,534,097 and 2011/0315310 show various examples.

Portions 26 of the bottom wall of the container 24 are sized, shaped and arranged laterally adjacent to each other in a pattern and in abutting engagement with the second outer layer 18 at top surfaces 25 of the portions 26 in the closed position of the cover 15 to provide the cover 15 with support to resist deflation from a load at various positions and locations at the first outer surface of the first outer layer 14. The portions 26 form an integral, unitary support structure which defines a series of ridges and grooves in the bottom wall of the container 24. The portions 26 may be bonded to the outer surface of the second outer layer by one of the many bonding methods previously mentioned.

The panel assembly of FIG. 6 is substantially identical to the panel assembly of FIG. 7 except the panel assembly of FIG. 7 has a metal container 24' which is fastened to its cover 15 by bolts 28 and nuts 29. Consequently, same or similar parts of the container 24' which perform the same or similar function have the same reference number but a single prime designation. The bolts 28 extend through holes 36 formed through bottom wall portions 34 of the components 32 (or through holes 36' formed through bottom wall portions 34' of components 32' of FIG. 5) to join the components 32 to the bottom wall of the container 24'.

The panel assembly of FIG. 8 is substantially identical as the panel assembly of FIG. 7 except the panel assembly of FIG. 8 has a plastic container 24 similar to the plastic container 24 of FIG. 6. Consequently, the same or similar parts which perform the same or similar function have the same reference number. However, instead of the nuts 29 and bolts 28 of FIG. 7, the components 32 are fastened or joined to the plastic container 24 by resilient, plastic retaining connectors 27.

The fasteners 27 and 28 may be threaded or non-threaded fasteners, for fastening the components 32 to the bottom wall of the containers 24 and 24', respectively. The fasteners may be any of various devices for fastening the components 32 to the bottom wall of the container 24 or 24', such as an externally threaded screw or bolt (i.e. FIG. 7). A screw is characterized by a helical ridge, or external thread wrapped around a cylinder. The screw threads typically mate with a complementary thread or internal thread in the bottom wall of the container 24'. The internal thread may be in the form of a nut (i.e. 29 in FIG. 7) or an object that has the internal thread formed into it. The screw thread may also cut a helical groove in the material of the components 32 and the bottom wall of the container 24' as the screws 28 are inserted.

Each screw may be made from a wide range of materials, with steel being perhaps the most preferred, in many varieties. Where great resistance to corrosion is required, stainless steel, titanium, brass, bronze, monel or silicon bronze may be used. Galvanic corrosion of dissimilar metals can be prevented by a careful choice of material.

Some types of plastic, such as nylon or polytetrafluoroethylene (PTFE), can be threaded and used for fastenings requiring moderate strength and great resistance to corrosion or for the purpose of electrical insulation. A surface coating may be used to protect the fastener from corrosion (e.g. bright zinc plating for steel screws), to impart a decorative finish (e.g. jappaning) or otherwise alter the properties of the base material. Selection criteria of the screw materials include temperature, required strength, resistance to corrosion, joint material and cost.

The cellular core 16 (as well as the core 16" of FIG. 9) may be a honeycomb core. In this example, the cellular cores 16 and 16" have an open-celled structure of the type made up of tubes or a honeycomb, and are made mainly of polyolefin and preferably of polypropylene. It is also possible to use a cellular structure having closed cells of the foam type. The cores 16 and 16" may be made of polypropylene or aluminum honeycomb, balsa and polyurethane foam.

Each of the skins 14 and 18 (as well as skins 14" and 18" of FIG. 9), may be a fiber-reinforced thermoplastic skin. The thermoplastic of the skins, and the cores 16 and 16" may be polypropylene. At least one of the skins may be a woven skin, such as polypropylene skin. Each of the skins may be reinforced with fibers, e.g., glass fibers, carbon fibers or natural fibers. At least one of the skins may advantageously be made up of woven glass fiber fabric and of a thermoplastics material.

Each cover 15 or 15" may have a thickness in the range of 5 to 25 mm.

In one example method of making the cover 15 (as well as the cover 15" of FIG. 9), a stack of material is initially pressed in a low pressure, cold-forming mold. The stack is made up of the carpet layer 12, the first skin 14, the cellular core 16 and the second skin 18, and is pressed at a pressure lying in the range of $10 \times 10^5$ Pa. to $30 \times 10^5$ Pa. The first and second skins 14 and 18 are preferably pre-heated to make them malleable and stretchable. The first and second skins 14 and 18 have a forming temperature lying approximately in the range of 160° C. to 200° C., and, in this example, about 180° C.

In summary, FIGS. 3-9 show different embodiments of sandwich-type, structural, composite panel assemblies having a pattern of load-bearing components 32, 32' or 32", respectively, which are in abutting engagement and/or bonded or joined to a bottom wall of their respective containers 24, 24' and 40 in a closed position of their respective covers 15 and 15" to transfer a load appearing at the first outer surface of their respective outer layers 14 or 14" to the bottom wall of its respective container 24, 24' or 40. In FIG. 9 of the bottom wall portion 34" of the component 32" is in abutting engagement (but not joined) with an inner surface 44 of the bottom wall of the container 40 in the closed position of the cover 15". Each of the panel assemblies has basically the same structure and function as each of the other panel assemblies.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A flooring system comprising:
   a floor panel assembly including:
   a container having bottom and side walls;
   a compression-molded, composite cover for covering the container in a closed position of the cover, the cover having:
   a first outer layer with a first outer surface;
   a second outer layer with a second outer surface; and
   a core positioned between the outer layers and having a plurality of cavities, wherein the outer layers are bonded to the core by press molding; and
   one or more load-bearing components positioned between the second outer layer and the bottom wall of the container in the closed position of the cover; each of the load-bearing components being bonded or joined to second outer layer and in abutting engagement with the bottom wall in the closed position of the cover to transfer a load appearing at the first outer surface to the bottom wall of the container; and
   a floor having a cavity for receiving the floor panel assembly.

2. The system as claimed in claim 1, wherein thickness of the panel assembly is substantially equal to depth of the cavity.

3. The system as claimed in claim 1, wherein a plurality of load-bearing components are positioned between the second outer layer and the bottom wall of the container in the closed position of the cover.

4. The system as claimed in claim 1, wherein each of the load-bearing components includes at least one laterally extending attachment flange for attaching the component to the second outer layer.

5. The system as claimed in claim 4, wherein each of the components is u-shaped in section and includes a pair of laterally extending attachment flanges.

6. The system as claimed in claim 4, wherein each of the components has an annular attachment flange and wherein a part of each of the components is frustum-shaped.

7. The system as claimed in claim 1, further comprising at least one fastener for fastening the cover to the container in the closed position of the cover.

8. The system as claimed in claim 7, wherein each of the load-bearing components includes a fastener-receiving aperture in communication with and aligned with a fastener-receiving aperture formed in the bottom wall of the container in the closed position of the cover and wherein fasteners are received and retained within their respective aligned apertures to fasten the container to the cover in the closed position of the cover.

9. The system as claimed in claim 8, wherein each of the fasteners is threaded.

10. The system as described in claim 1, wherein portions of the bottom wall are sized, shaped and arranged laterally adjacent to each other in a pattern and in abutting engagement with the second outer layer in the closed position of the cover to provide the cover with support to resist deflation from a load at various positions and locations at the first outer surface of the first outer layer.

11. The system as claimed in claim 10, wherein the portions form an integral, unitary support structure.

12. The system as claimed in claim 11, wherein the support structure defines a series of ridges and grooves.

13. The system as claimed in claim 10, wherein a load-bearing component is positioned between each pair of laterally adjacent portions in the closed position of the cover.

14. The system as claimed in claim 1, wherein each of the load-bearing components is a plastic resin component bonded to the second outer layer.

15. The system as directed in claim 14, wherein the bottom wall of the container is a plastic resin bottom wall and wherein each of the plastic resin components is bonded to the plastic resin bottom wall.

16. The system as directed in claim 14, wherein the bottom wall of the container is a metal bottom wall.

17. The system as claimed in claim 1, wherein the cover has a cover layer bonded to an upper surface of the first outer layer.

18. The system as claimed in claim 1, wherein an edge portion of the cover is locally crushed by the press-molding so that the layers are bonded together to form a sealed, moisture-resistant edge.

19. A vehicle interior panel system comprising:
   a panel assembly including:
   a container having bottom and side walls;
   a compression-molded, composite cover for covering the container in a closed position of the cover, the cover having:
   a first outer layer with a first outer surface;
   a second outer layer with a second outer surface; and
   a core positioned between the outer layers and having a plurality of cavities, wherein the outer layers are bonded to the core by press molding; and
   one or more load-bearing components positioned between the second outer layer and the bottom wall of the container in the closed position of the cover; each of the load-bearing components being bonded or joined to second outer layer and in abutting engagement with the bottom wall in the closed position of the cover to transfer a load appearing at the first outer surface to the bottom wall of the container; and
   a vehicle interior structure having a cavity for receiving the panel assembly.

20. A vehicle flooring system comprising:
   a floor panel assembly including:
   a container having bottom and side walls;
   a compression-molded, composite cover for covering the container in a closed position of the cover, the cover having:
   a first outer layer with a first outer surface;
   a second outer layer with a second outer surface; and
   a core positioned between the outer layers and having a plurality of cavities, wherein the outer layers are bonded to the core by press molding; and
   one or more load-bearing components positioned between the second outer layer and the bottom wall of the container in the closed position of the cover; each of the load-bearing components being bonded or joined to second outer layer and in abutting engagement with the bottom wall in the closed position of the cover to transfer a load appearing at the first outer surface to the bottom wall of the container; and
   a vehicle floor having a cavity for receiving the floor panel assembly.

* * * * *